April 22, 1952  M. U. SQUIERS  2,594,231
VISOR FOR VEHICLES
Filed Nov. 7, 1950  2 SHEETS—SHEET 1
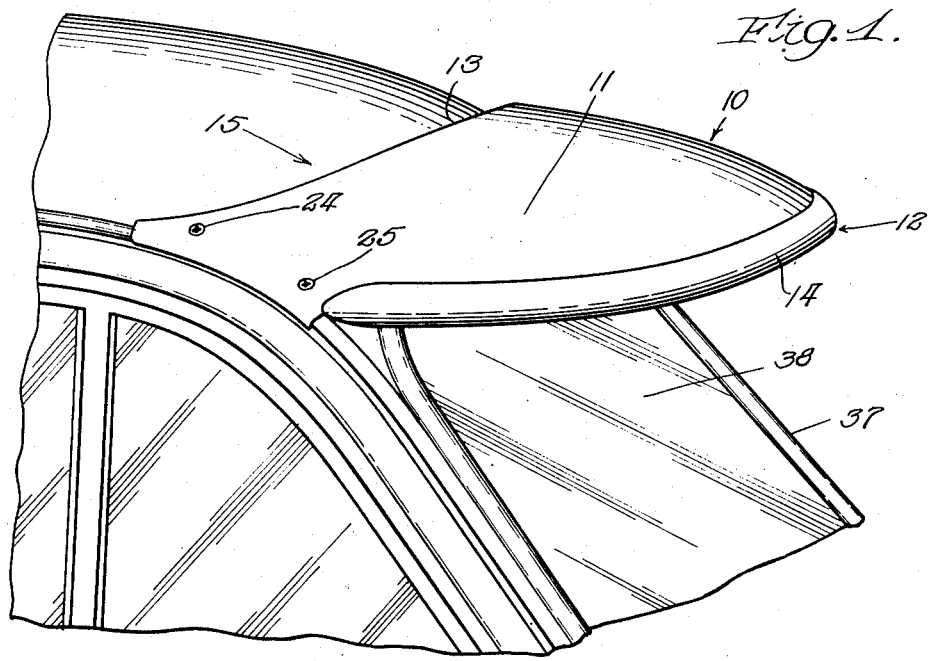
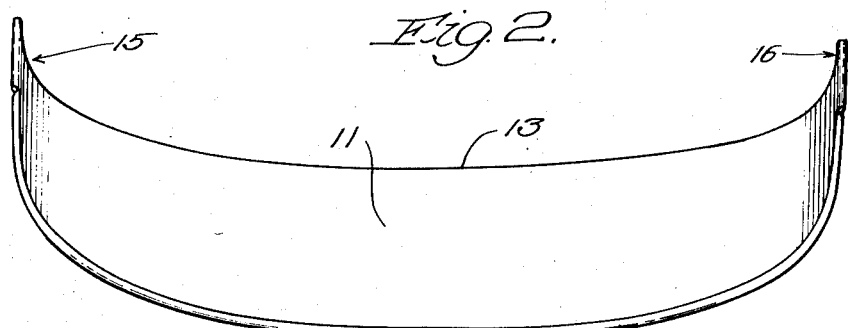
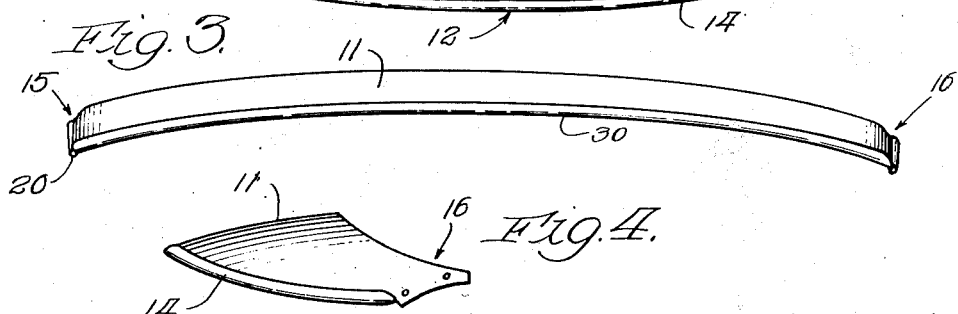
Inventor:
Max U. Squiers,
By Schroeder, Merriam,
Hofgren & Brady, Attys.

April 22, 1952  M. U. SQUIERS  2,594,231
VISOR FOR VEHICLES
Filed Nov. 7, 1950  2 SHEETS—SHEET 2
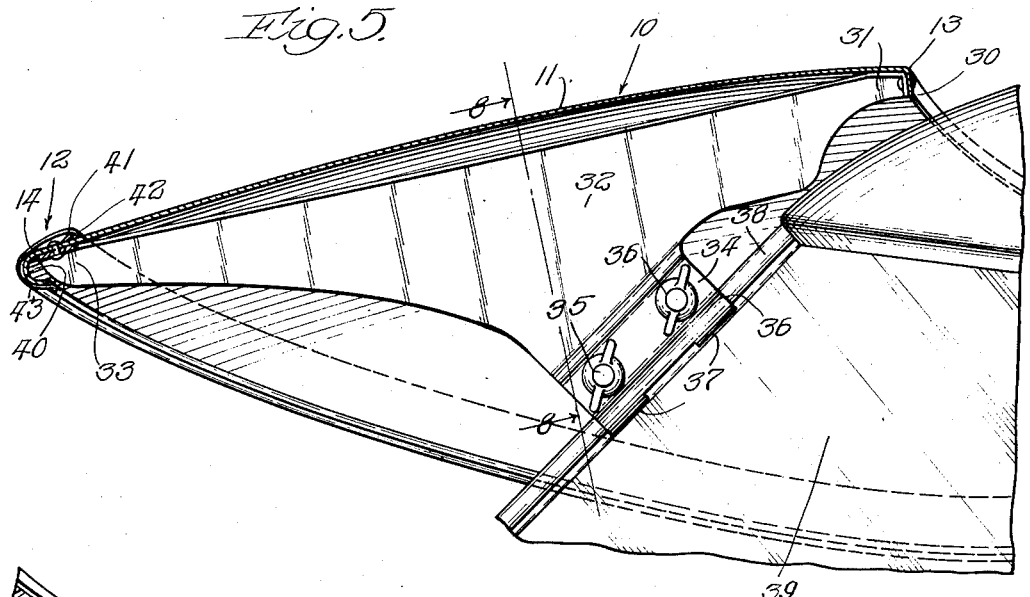
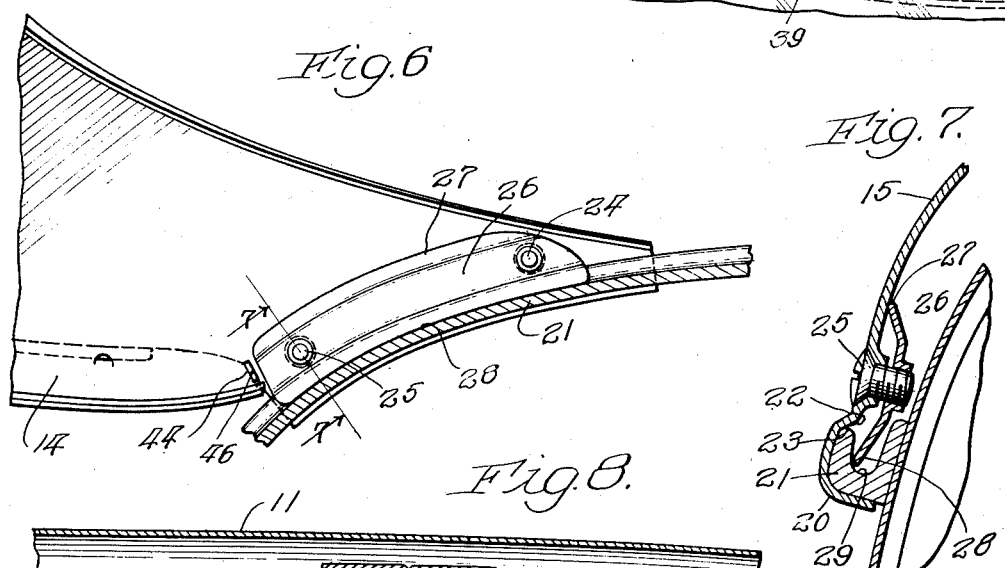
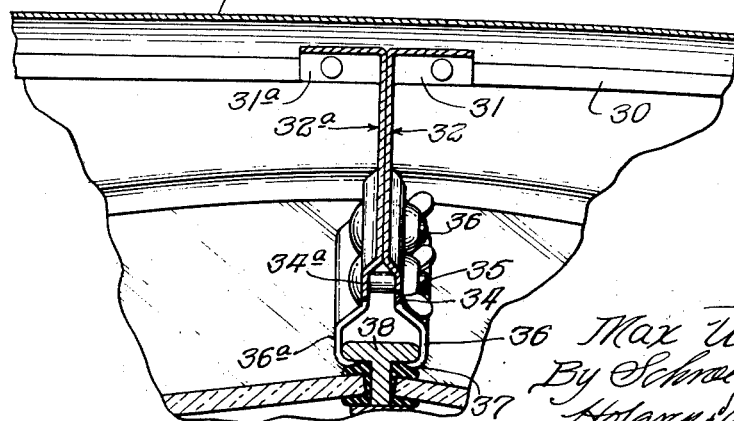
Inventor:
Max U. Squiers,
By Schroeder, Merriam,
Hofgren & Brady, Attys.

Patented Apr. 22, 1952

2,594,231

UNITED STATES PATENT OFFICE 2,594,231

VISOR FOR VEHICLES

Max U. Squiers, La Grange, Ill., assignor to Charles Peckat Manufacturing Co., a corporation of Illinois Application November 7, 1950, Serial No. 194,484

2 Claims. (Cl. 296—95)

This invention relates to a visor for vehicles, and more particularly to a windshield visor for use with an automotive vehicle.

It is the principal object of this invention to produce a new and improved windshield visor and mounting means therefor.

One of the features of this invention is the provision of a windshield visor which is particularly adaptable for use with a vehicle having a smoothly curved top, as for example an automobile, the visor being so designed as to blend with the curves of the vehicle and to give the appearance as being an integral part thereof.

Another feature of this invention is the provision of a windshield visor having leading and trailing edges which sweep rearwardly and terminate in side edges located rearwardly of the trailing edge together with means for securing the side edges to the vehicle, the effect of the construction being to produce an extremely neat appearing visor and one which offers the minimum of obstruction to side-to-side view through the windshield.

A further feature of the invention is the provision of a windshield visor of the type described in the preceding paragraphs which is provided with an integral flange at its side edges, the flange being adapted to be positioned under a rain gutter on the vehicle and to be clamped thereagainst.

Yet another feature of the invention is the provision of clamping means to be used with a windshield visor of the type described in the preceding paragraph which clamping means may be located beneath the side edges of the visor, and hence obscured from view, the effect being to produce a readily attachable windshield visor which when attached gives the appearance of being an integral part of the body construction.

Another feature of the invention is the provision of a windshield visor having leading and trailing edges which sweep rearwardly and terminate in side edges located rearwardly of the trailing edge, with the side edges being provided with flanges adapted to be positioned under a rain gutter of the vehicle and with the side edges possessing a length sufficient to locate at least portions of the flanges at widely spaced points along the gutter to provide a firm and secur mounting for the visor.

An additional feature of the invention is the provision of a one-piece visor provided with a bridge plate at its center, the plate being attached at one point to the leading edge of the visor and at another point to the trailing edge, to stabilize and stiffen the visor against wind forces, the bridge plate being further featured by the fact that it is located above a horizontal plane passing through the leading edge of the visor when it is attached to the vehicle so as normally to be out of sight.

Other and further features of the invention will become apparent from the following description and drawings, in which:

Fig. 1 is a side elevation showing the visor of this invention secured to a vehicle;

Fig. 2 is a top plan view of the visor;

Fig. 3 is a front elevation of the visor shown in Fig. 2;

Fig. 4 is a detailed view of one of the side edges of the visor;

Fig. 5 is a vertical section through the central portion of the visor showing the method of securing that portion to the vehicle;

Fig. 6 is a view of the inside of the visor showing the method of securing it to the car;

Fig. 7 is a section along line 7—7 of Fig. 6; and

Fig. 8 is a section along line 8—8 of Fig. 5.

While the invention is susceptible of embodiment in many difference forms, there is shown in the drawings and hereinafter described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to Figs. 1 to 4 of the drawings, the visor 10 comprises a body portion 11 having a leading edge generally designated 12 and a trailing edge 13. A trim strip of resilient decorative material 14 may be secured to the leading edge to enhance the appearance of the visor; the particular manner of attaching the trim strip 14 to the visor will be hereinafter set forth in more complete detail.

It will be noted that the leading edge 12 is convexly curved while the trailing edge 13 is concavely curved to produce a sweepback of the visor which terminates in the side edges of the visor 15 and 16. The sweepback of the visor is so designed as to position the side edges 15 and 16 rearwardly of the trailing edge 13 with the result that the visor body itself projects forwardly of the side edges and over the windshield of the vehicle.

In describing the side edges, only one of them, namely the side edge 15, will be described in complete detail inasmuch as the side edges and accessories are the same for both sides with the exception of being reversed left for right.

Referring now to Figs. 6 and 7, it will be noted that the side edge 15 terminates in an integral flange 20 which is adapted to be positioned under a rain gutter 21 mounted on the vehicle. Immediately above the flange 20, there is a shoulder 22 formed in the side edge which shoulder is adapted to seat upon the lip 23 of the rain gutter. As previously noted, the visor is of one-piece construction and the side edges, shoulder and flange are integral therewith and blend in with the visor by smooth curves, rather than by angles, which produces a pleasing appearance. It is contemplated that the visor material be resilient, for example of steel, so that the portions thereof which are secured to the rain gutter are somewhat resilient and may adapt themselves to slight variations in construction from vehicle to vehicle as they are clamped thereto.

It will be noted that each side edge is provided with a pair of spaced openings to receive screw devices 24 and 25 which extend through the visor and are threaded into a clamping plate 26 located on the underside of the side edges. The clamping plate is bowed inwardly to have a top edge 27 in contact with the side edge of the visor above the fastening devices and a lower edge 28 in contact with the inside 29 of the rain gutter. As the screw devices 24 and 25 are tightened the bowed construction of the clamping plate produces an action which may be likened to a toggle arm, securely to wedge the visor against the rain gutter of the vehicle.

As previously stated, the clamping plate 26 is located on the underside of the side edges and thus the only portion of the means for securing the visor to the vehicle which is visible on the outer side of the visor are the screw devices 24 and 25. Thus the visor has the appearance of being an integral part of the vehicle.

It will be noted that the side edges are relatively long, and hence the flanges 20 thereon extend a substantial distance along the rain gutter 21. Thus the front and rear ends of the flanges are comparatively widely spaced and, in effect, produce a lever arm of substantial length to resist turning forces on the visor. By the construction described, the visor is firmly fixed to the vehicle and will remain in place even under severe turning forces which are created when the vehicle is in rapid motion.

As will be noted from an inspection of Fig. 5, the trailing edge 13 of the visor is provided with a turned down flange 30 which extends from end to end of the trailing edge. To the flange 30 there is secured one apex 31 of a substantially triangular bridge plate 32 which has another apex 33 secured to the leading edge 12 of the visor. As can be seen in Fig. 8, two such bridge plates, namely, 32 and 32a, are provided at the center of the vehicle and extend from the leading to the trailing edge transversely of the longitudinal or major axis of the visor. Inasmuch as the bridge plates are substantially identical, like parts will be given like reference numerals with the reference numerals pertaining to the bridge plate 32a carrying the suffix "a."

Each of the bridge plates extends downwardly in contact with the other to a bowed-out portion 34 to provide a space between the plates through which screw devices 35 and 36 extend. The bridge plates are further bent outwardly below the portions 34, 34a to form portions 36, 36a, which terminate in inturned flanges 37, 37a adapted to extend under the edges of a center post 38 located at the center of the windshield 39. It is believed obvious from the foregoing that by tightening the wing units associated with the screw devices 35 and 36, the inturned flanges 37, 37a are wedged beneath the center post 38 to form a firm anchor for the bridge plates.

The provision of the bridge plates located at the center of the visor is advisable where the visor is of one-piece construction, that is, where the visor is not furnished with a reinforced center section. The bridge plates 32 and 32a are so designed, however, as to lie closely beneath the visor, and hence substantially all of the bridge plates are out of view, lying above a horizontal plane passing through the leading edge of the vehicle.

The leading edge 12 of the visor is provided with a turned down flange periphery 40. Provided on the upper surface of the visor is an upturned ear 41 which is adapted to receive a U-shaped inner upper end 42 of the trim strip 14, the trim strip being so formed at its opposite edge 43 as to conform generally to the peripheral flange 40. As previously stated, the trim strip 14 is of resilient material, and thus may be positioned on the visor with the U-shaped portion 42 hookingly engaging the ear 41 and with the balance of the trim strip snapped around the flanged periphery of the visor, the natural resilience of the trim strip creating a force to hold it in place. As will be noted from Fig. 6, the ends 44 of the trim strip are pointed to form a tongue 45 adapted to be inserted in a slot 46 formed at the ends of the leading edge. Thus the extremities of the trim strip are held in position snugly against the leading edge of the visor by the resilience of the strip as the tongues are inserted into the slots.

I claim:

1. A visor and moulding strip attachment therefor, comprising: a visor body of sheet material having a flanged periphery and having an upstanding ear adjacent but spaced from said flange and on the opposite side of the sheet therefrom, a moulding strip of resilient material having at least a portion of one edge shaped as a U adapted to engage said ear and having at least a portion of the opposite edge bent generally to conform to said flange and the ends of said strip being provided with means forming a tongue, a pair of slots in said visor adapted to receive the tongues, said strip being deformable to cause said U-shaped portion hookingly to engage said ear and said bent edge portion to engage said flange and said tongues to enter and engage said slots, the resiliency of said strip creating a force to maintain such engagement to secure the strip to the visor body.

2. A visor and moulding strip attachment therefor, comprising: a visor body of sheet material having a turned front periphery curving downwardly and rearwardly and having an upstanding ear adjacent but spaced from said edge, said ear extending obliquely to the plane of said sheet and having an edge facing generally away from said front periphery, a slot adjacent each end of said front periphery, and a moulding strip of resilient material having a U-shaped edge hookingly to engage said ear and having its opposite edge curved to conform generally to said periphery, said moulding strip having pointed ends forming tongues each adapted to be inserted in a different one of said slots, said strip being deformable to cause said U-shaped edge hookingly to engage said ear and said curved opposite edge to engage said turned periphery and said tongues to enter and engage said slots, the resilience of said strip creating a force to maintain such engagement to secure the strip to the visor body.

MAX U. SQUIERS.

REFERENCES CITED

The following references are of record in the file of this patent:

UNITED STATES PATENTS

| Number | Name | Date |
|---|---|---|
| D. 154,735 | Arbib | Aug. 9, 1949 |
| 2,334,856 | Atkinson | Nov. 23, 1943 |
| 2,527,247 | Dieterich | Sept. 9, 1949 |
| 2,534,763 | Flavin | Dec. 19, 1950 |